Jan. 16, 1945. W. N. PATTERSON 2,367,426
WINDSHIELD PROTECTOR AND CLEANER FOR AIRPLANES
Filed Aug. 29, 1941 2 Sheets-Sheet 1
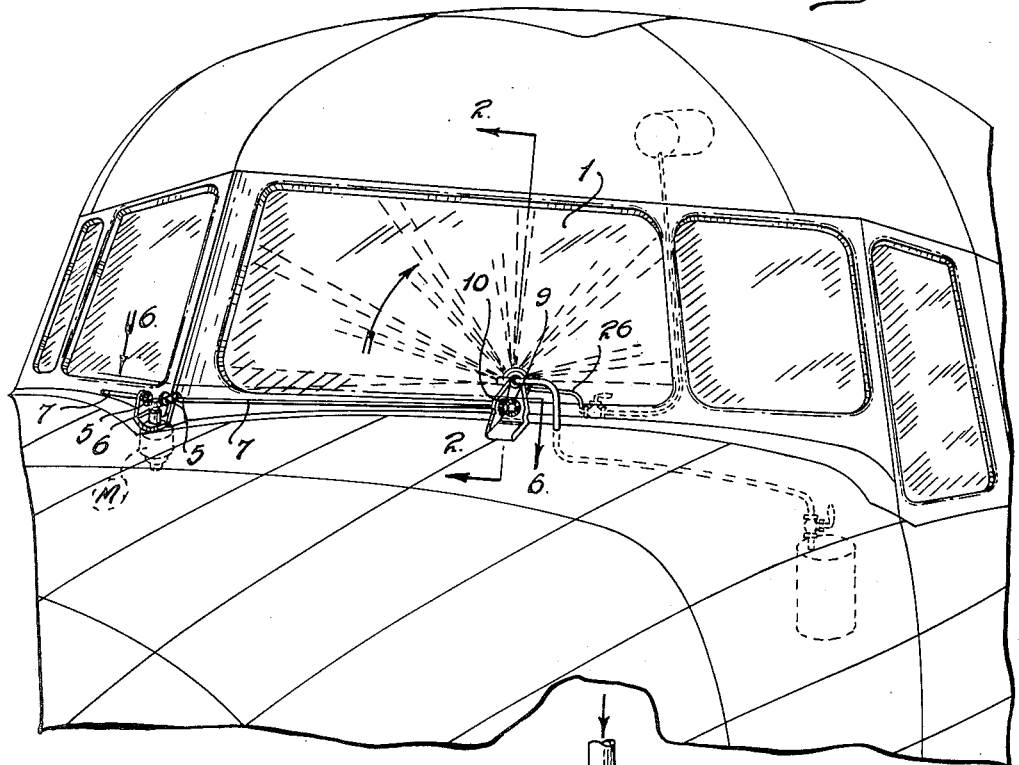
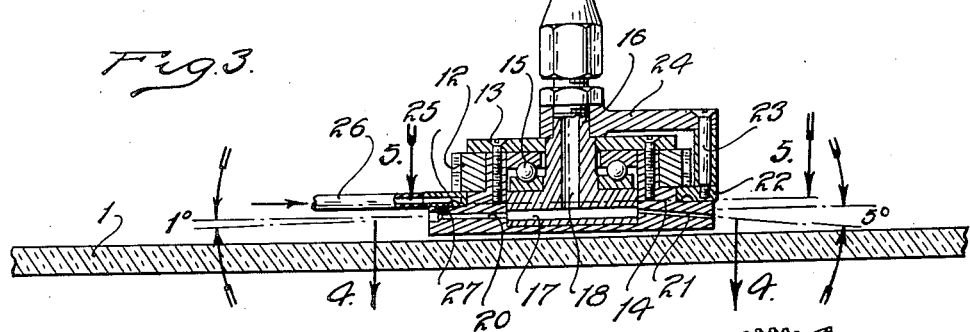
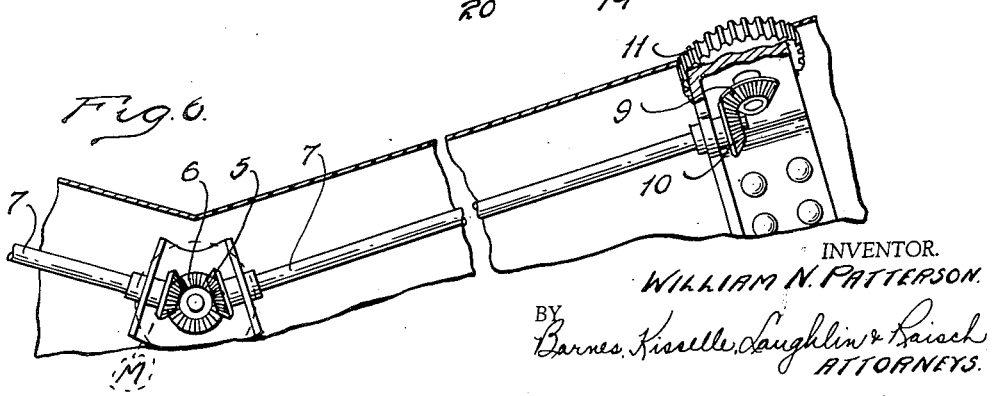
INVENTOR.
WILLIAM N. PATTERSON.
BY Barnes, Kisselle, Laughlin & Raisch
ATTORNEYS.

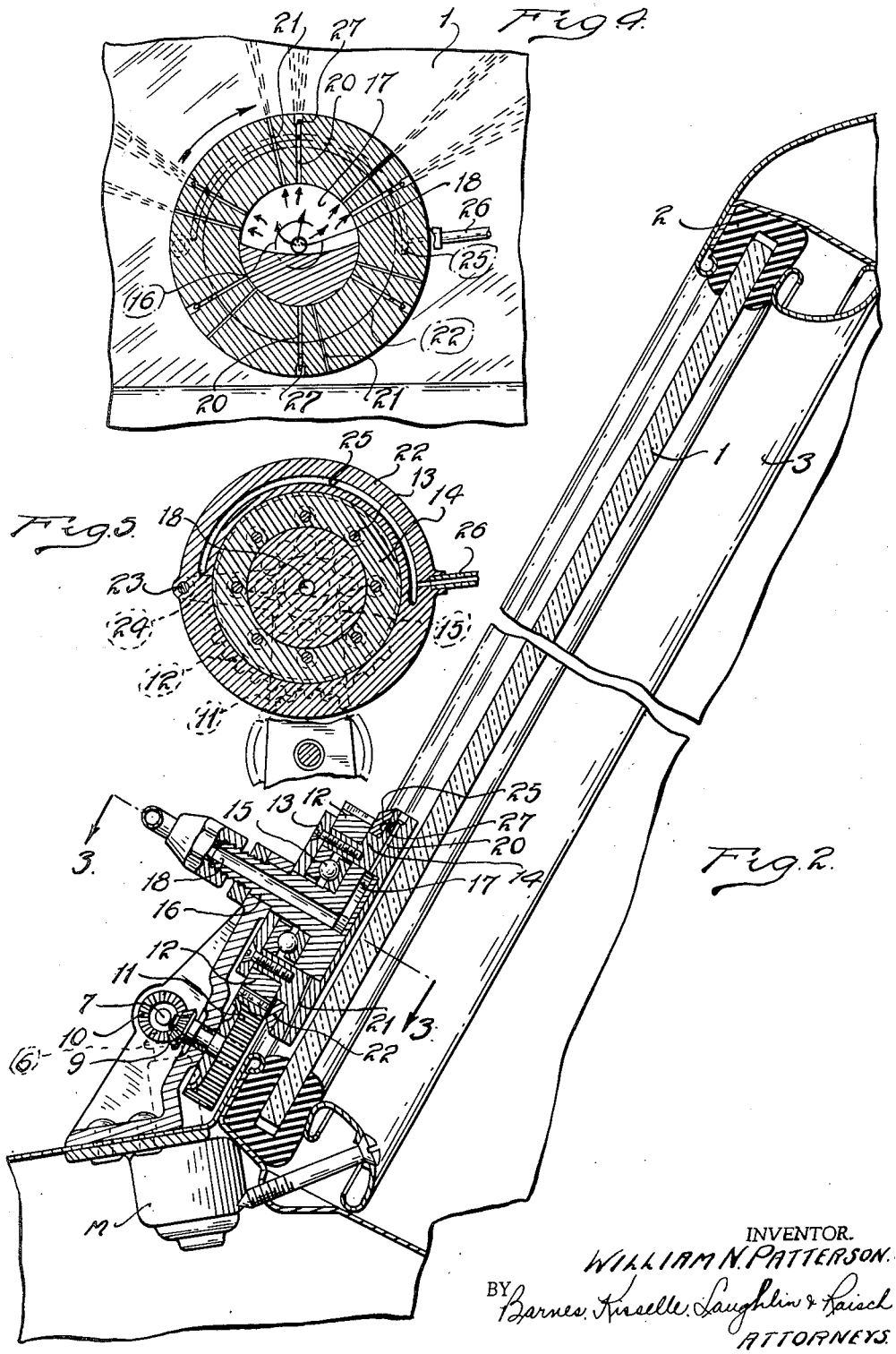

Patented Jan. 16, 1945

2,367,426

UNITED STATES PATENT OFFICE 2,367,426

WINDSHIELD PROTECTOR AND CLEANER
FOR AIRPLANES

William N. Patterson, Detroit, Mich., assignor to
Patterson Industries Incorporated, Detroit,
Mich., a corporation of Michigan Application August 29, 1941, Serial No. 408,778

16 Claims. (Cl. 20—40.5)

This invention relates to windshield protectors and cleaners, particularly for high speed vehicles such as airplanes. Airplanes, because of their great speed and the freezing atmosphere that they often meet at high altitudes, present special problems in keeping the windshield clean. It has been found that the conventional windshield wipers, whether of the vacuum type, or driven by positive air pressure or mechanically, are impractical for use on airplanes. Hence, airplanes usually have no windshield wipers. This makes it very difficult for the pilot to guide the machine in landing in a storm.

It is the object of the present invention to provide a curtain of high velocity air in front of and substantially parallel with the windshield which will tend to keep off rain, snow, etc. It is not new to provide air jets across a windshield but so far as I have been advised, these air jets, where they have been used to form a protecting curtain, have been stationary jets. Stationary jets are objectionable because they create a vacuum and tend to draw water and other matter in suspension in the air onto the shield.

I am aware that it has been proposed to use continuously operating jets of heated air directed in connection with swinging windshield wipers but this is for quite a different purpose, to wit: the blowing of heated air upon the windshield for the purpose of melting snow or ice. I am aware also that it has been proposed to blow heated air onto a shop window through large diameter air nozzles which oscillate and gently distribute heated air over the window. But I propose to whirl a set of very high pressure jets of air across the outer surface of the windshield substantially adjacent and parallel therewith. These high velocity jets move at the rate of about one hundered revolutions per minute. These jets are such as are created by approximately one hundred to one hundred fifty pounds air pressure and air nozzles of a diameter approximately .055 of an inch. Such jets have great velocity and afford a curtain of high velocity air parallel with the surface of the windshield. It is very difficult for anything to penetrate this high velocity curtain of air even with the speed attained by the modern passenger-carrying planes.

During summer and moderately cool atmosphere this will be sufficient to keep the windshield clean. However, in cold atmosphere ice tends to freeze on the shield and I supply these air jets with a suitable quantity of non-freezing liquid such as alcohol. This liquid is thrown across the shield with such great velocity that it works much like a sand blast and tears or forces any ice off the shield. It is well understood that liquid under very high velocity has almost the penetrating power of a solid.

In the drawings:

Fig. 1 is an elevation of the front of an airplane equipped with my improved windshield cleaner.

Fig. 2 is a section taken on the line 2—2 of Fig. 1.

Fig. 3 is a section taken on the line 3—3 of Fig. 2.

Figs. 4 and 5 are sections taken on the corresponding section lines of Fig. 3.

Referring to Fig. 2, I designates the windshield glass, 2 the rubber weather seal in which the glass is set, and 3 the garnish molding. An electric motor M is bolted or riveted to the cowl of the plane and this has a drive shaft 4 and mitre gears 5 and 6 (Fig. 6) which drive the shaft 7. These shafts through mitre gears 9 and 10 drive a spur gear 11 which in turn drives gear 12 which is bolted by screws 13 to the rotating head 14. This gear and head rotate on the ball bearings 15 which space the rotating head from the stationary head 16. This stationary head is provided with a slot 17 in its upper half. This slot or distributing recess is provided with air through the conduit 18. This is high pressure air furnished by a pump or suitable reservoir and preferably the pressure will be in the neighborhood of one hundred to one hundred fifty pounds to the square inch.

The rotating head rotates approximately one hundred revolutions per minute and is provided with six nozzles 20. These nozzles have their axes at a slight angle to the outside surface of the glass, preferably about one-half of one degree (see Fig. 3). To take care of the portion of the glass immediately adjacent the rotating head, which would otherwise not be struck by the jet, I employ smaller subsidiary nozzles 21. These are set at a five degree angle to the glass so as to impact the glass very close to the rotating head and make sure that this portion of the glass is also provided with a curtain of air.

Fitted in between the gear 12 and the rotating head is a stationary ring 22, the details of which are shown in Fig. 5. This ring is held from moving by screw 23 (see Fig. 3) which connects it with the stationary arm 24. This ring is provided with a segmental slot 25 which is connected with an alcohol pipe 26. Alcohol or any other suitable non-freezing liquid may be used. Each one of the main nozzles is provided with an oblique passageway 27 which connects the nozzle with the arcuate slot or recess 25 in the ring 22. Hence, each nozzle when it is rotating through the upper half of its cycle is connected with the air source by being in registration with the distributing recess 17 and is also connected with a source of anti-freeze liquid as passageway 27 rotates the length of the arcuate slot 25. The alcohol or non-freezing liquid is drawn out of this slot 25 by an aspirating or injector action of the high pressure air and is mixed with the air stream. This liquid, as stated above, when thrown at great velocity acts like a solid and is calculated to tear off any ice forming on the windshield because the air and liquid, directed at a slight angle toward the windshield surface, get in under the ice and between the ice and the glass and act as a wedge to pry the ice loose. In moderate or warm weather when no ice is forming on the shield, there will be no need of using the alcohol and this can be turned off by a suitable valve not shown.

The formation of ice on an airplane windshield is sometimes an unexpected event. Under certain conditions a sheet of ice will form over the windshield almost instantly. This may happen just before a landing as the plane passes through varying atmospheres. It is a function of the present invention to knock off this in a few seconds after its formation by the combined air and liquid stream which gets under the ice and removes it.

This application is a continuation in part of application Serial No. 366,509, filed November 20, 1940.

What I claim is:

1. In an apparatus for protecting and keeping a windshield clean, particularly an airplane windshield, the combination of a continuously rotating distributing head rotatably supported adjacent the windshield and provided with one or more nozzle openings for delivering across a portion of the windshield approximately parallel therewith jets of a gaseous medium such as air, means for supplying such medium under pressure to the distributor and the nozzle or nozzles, means for rotating the distributing head, the said distributing head comprising a plurality of passageways and ports and a fixture provided with a segmental slot for registering with said ports so that the protecting fluid is delivered only on part of the cycle of rotation of the nozzle or nozzles.

2. In an apparatus for protecting and keeping a windshield clean, particularly an airplane windshield, the combination of a rotating distributing head rotatably supported adjacent the windshield and provided with a plurality of nozzle openings for delivering across a portion of the windshield approximately parallel therewith jets of a gaseous medium such as air, means for supplying such medium under pressure to the distributor and the nozzles and means for rotating the distributing head, the said pressure of the gas being relatively high and the nozzle passageways of comparatively small diameter to afford very high velocity jets to provide a high velocity curtain when high pressures are met by the vehicle in its travel through the atmosphere.

3. In an apparatus for protecting and keeping a windshield clean, particularly an airplane windshield, the combination of a rotating distributing head rotatably supported adjacent the windshield and provided with a plurality of nozzle openings for delivering across a portion of the windshield substantially parallel therewith jets of a gaseous medium such as air, means for supplying such medium under pressure to the distributor and the nozzles and means for rotating the distributing head, the medium discharged from the jets being of greater relative velocity over a sufficient area of the windshield to protect the vision of the pilot or the driver than pressures and velocities met in the travel of the vehicle through the atmosphere.

4. In an apparatus for protecting and keeping a windshield clean, particularly an airplane windshield, the combination of a rotating distributing head rotatably supported adjacent the windshield and provided with a plurality of nozzle openings for delivering across a portion of the windshield substantially parallel therewith jets of a gaseous medium such as air, means for supplying such medium under pressure to the distributor and the nozzles and means for rotating the distributing head, the velocity of the gas jets being substantially such as is created by a pressure in the neighborhood of one hundred to one hundred fifty pounds per square inch on the gaseous medium and a nozzle having a diameter in the neighborhood of fifty-five thousandths (.055) of an inch.

5. In an apparatus for protecting and keeping a windshield clean, particularly an airplane windshield, the combination of a rotating distributing head rotatably supported adjacent the windshield and provided with a plurality of nozzle openings for delivering across a portion of the windshield substantially parallel therewith jets of a gaseous medium such as air, means for supplying such medium under pressure to the distributor and the nozzles and means for rotating the distributing head, the velocity of the gas being substantially such as is created by a pressure in the neighborhood of one hundred to one hundred fifty pounds per square inch on the gaseous medium and a nozzle having a diameter in the neighborhood of fifty-five thousandths (.055) of an inch and a distributing head having a rotational speed in the neighborhood of one hundred rotations a minute.

6. In an apparatus for protecting and keeping a windshield clean, particularly an airplane windshield, the combination of a rotating distributing head rotatably supported adjacent the windshield and provided with a plurality of nozzle passageways and openings for delivering across a portion of the windshield a gaseous medium such as air, means for supplying such medium under pressure to the distributor and the nozzles, means for rotating the distributing head, a fixture having a surface with a segmental slot, said slot being in communication with the gas supply and said surface contacted by a surface on the rotating distributor head and ports at the ends of the nozzle passageway that successively register with the segmental slot to deliver gas continuously but only for a portion of the travel of the nozzles as they rotate with the distributor head.

7. The method of keeping a windshield of a high speed vehicle clean which comprises the directing across and substantially parallel with a portion of the windshield a plurality of radial revolving jets of high velocity air, the velocity being so high as to substantially exclude the elements through which the vehicle is moving reaching the protected surface of the glass.

8. In an apparatus for protecting and keeping a windshield clean, particularly an airplane windshield, the combination of a rotating distributing head rotatably supported adjacent the windshield and provided with a plurality of nozzle openings for delivering across a portion of the windshield substantially parallel therewith jets of a gaseous medium such as air and a non-freezing liquid, means for supplying such medium under pressure and such liquid to the distributor and the nozzles and means for rotating the distributing head, the medium discharged from the jets being of greater relative velocity over a sufficient area of the windshield to protect the vision of the pilot or the driver than pressures and velocities met in the travel of the vehicle through the atmosphere.

9. In an apparatus for protecting and keeping a windshield clean, particularly an airplane windshield, the combination of a rotating distributing head rotatably supported adjacent the windshield and provided with a plurality of nozzle openings for delivering across a portion of the windshield substantially parallel therewith jets of a gaseous medium such as air and a non-freezing liquid, means for supplying such medium under pressure and such liquid to the distributor and the nozzles and means for rotating the distributing head, the velocity of the gas jets being substantially such as is created by a pressure in the neighborhood of one hundred to one hundred fifty pounds per square inch on the gaseous medium and a nozzle having a diameter in the neighborhood of fifty-five thousandths (.055) of an inch.

10. The method of keeping a windshield of a high speed vehicle clean which comprises the directing across and substantially parallel with a portion of the windshield a plurality of radial revolving jets of high velocity air and non-freezing liquid, the velocity being so high as to substantially exclude the elements through which the vehicle is moving reaching the protected surface of the glass.

11. In an apparatus for protecting and keeping a windshield clean, a rotating distributing head provided with a plurality of air nozzles for directing a high pressure air stream substantially parallel to and upon the windshield and a plurality of subsidiary nozzles for directing an air stream at an angle to and toward the windshield glass to bring air into contact with the glass immediately adjacent the distributing head and means for furnishing air under high pressure to said rotating head.

12. In an apparatus for protecting and keeping a windshield clean, particularly an airplane windshield, the combination of a stationary head provided with a large recess in its upper periphery, a rotating head for rotating about the stationary head, said rotating head provided with nozzles for directing high pressure air jets substantially parallel with and onto the windshield glass and also provided with subsidiary nozzles for directing high pressure air at an angle to the glass for furnishing high pressure air on the glass immediately adjacent the rotating head and means for furnishing high pressure air to the recess in the upper portion of said stationary head.

13. In an apparatus for protecting and keeping a windshield clean, particularly an airplane windshield, the combination of a stationary circular head provided with a slot in the upper portion, a stationary ring supported on the outside of the circular head and provided with an arcuate slot, means for furnishing high pressure air to the slot in the stationary head, means for furnishing a non-freezing liquid to the arcuate slot in the ring and a rotating distributing head rotating upon said stationary head and in contact with said ring and ring slot, said distributing head provided with a plurality of nozzles for delivering high pressure jets of air and non-freezing liquid substantially parallel to the windshield glass, said nozzles provided with obliquely disposed connecting passageways for registering with the arcuate slot of the said ring when the rotating head revolves and drawing the non-freezing liquid from said slot by the aspirating action of the air passing through the nozzles.

14. The method of clearing accumulated ice from a surface of a vehicle which comprises the directing of a high velocity jet of compressed air and non-freezing liquid within said jet across the surface to be cleaned.

15. The method of clearing accumulated ice from a surface of a vehicle which comprises the directing of a high velocity jet of compressed air and non-freezing liquid within said jet across the surface to be cleaned, and moving the jet in a direction transverse to its flow.

16. The method of clearing accumulated ice from a surface of a vehicle which comprises directing a plurality of high velocity streams of compressed air mixed with non-freezing liquid at varying angles across adjacent portions of the surface to be cleaned, and moving the streams rapidly in succession across the windshield in a direction transverse to their flow.

WILLIAM N. PATTERSON.